Aug. 18, 1959     H. GAFFIN     2,899,984
PIPE SLEEVE AND GASKET THEREFOR
Filed June 21, 1955
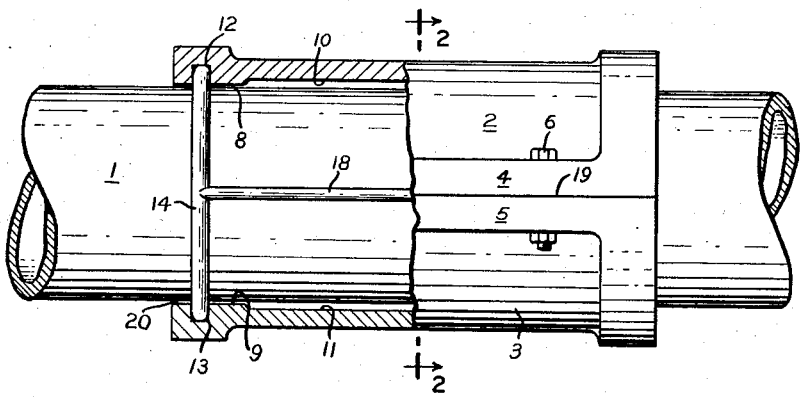
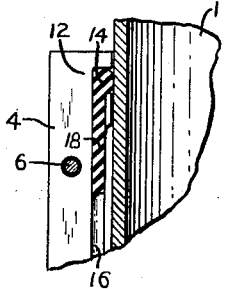
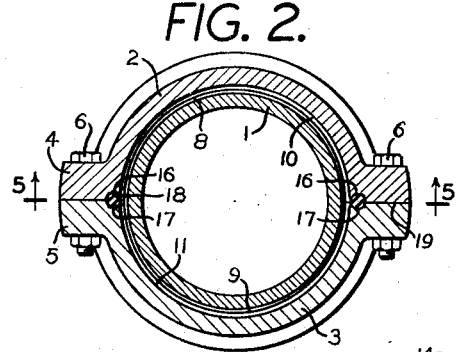
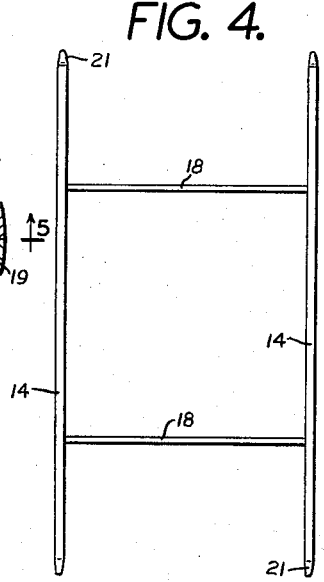
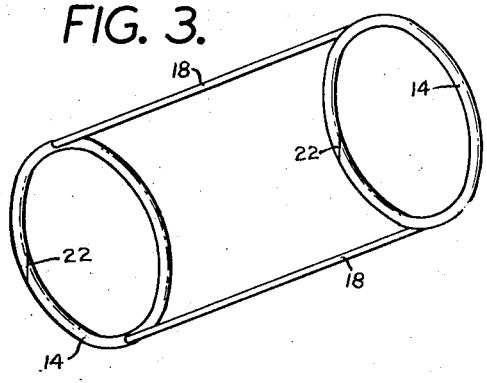
INVENTOR
HARRY GAFFIN.
BY
ATTORNEY

United States Patent Office 2,899,984
Patented Aug. 18, 1959

2,899,984

PIPE SLEEVE AND GASKET THEREFOR

Harry Gaffin, East Orange, N.J., assignor to The A. P. Smith Manufacturing Company, East Orange, N.J., a corporation of New Jersey Application June 21, 1955, Serial No. 516,825

3 Claims. (Cl. 138—99)

This invention relates to improvements in pipe sleeves and gasket constructions for such sleeves.

More particularly, the invention is concerned with so-called mechanical joint split pipe sleeves, in which rubber or similar gaskets are utilized instead of soft packing, poured lead or the like. In such constructions, the two halves of the sleeve must be sealed together along their edges and these must also be sealed to the pipe at their ends, two longitudinally extending straight gasket pieces and two circumferentially extending ring shaped gasket pieces being customarily employed for this purpose. Since the straight edges of the sleeve halves are sealed to each other, rather than to the pipe, and the ends are sealed to the pipe, difficulty arises in forming a seal at the point where the straight edge gaskets meet the circular end gaskets. Inherent difficulty in the seal formation may, of course, also be enhanced by errors of the workmen in cutting the gasket material.

It is an object of the invention to provide a one piece gasket eliminating the difficulty in sealing the straight gasket sections and circular gasket sections together.

It is a further object of the invention to provide a one piece gasket specifically adapted for the coupling with which to be used and therefore eliminating errors in cutting the gasket piece to a particular coupling.

The pipe sleeve and gasket of the invention will now first be described with reference to the accompanying drawing, and the features forming the invention will then be pointed out in the appended claims.

In the drawing:

Fig. 1 is a view, partly in side elevation and partly in central longitudinal section, of a pipe sleeve construction embodying the invention in a preferred form;

Fig. 2 is a section on the line 2—2 of Fig. 1;

Fig. 3 is an isometric view of the gasket utilized in the construction shown;

Fig. 4 is a flat or plan view of the gasket as preferably made and before fitting into the sleeve;

Fig. 5 is an enlarged fragmentary section.

In Fig. 1, the sleeve is shown in place on a pipe 1. It will be noted that it is placed around a single pipe, as distinguished from being utilized as a coupling for two lengths of pipe, being intended for purposes of repair or for use in making temporary or permanent connection to an existing pipe. The sleeve comprises two halves 2 and 3 which may be, and are shown as, identical and which have side flanges 4 and 5, held together by means of bolts 6. The ends of the sleeve sections are somewhat thickened and are formed with inner surfaces 8, 9 which, when the sleeve halves are bolted together, form cylindrical annular surfaces of slightly greater diameter than the pipe 1, which locate the sleeve with reference thereto. The interior walls 10, 11 of the sleeve generally are of slightly greater diameter. Surfaces 8 and 9 are interrupted by circumferential grooves 12, 13 which, when the sleeve halves are joined together, form annular grooves for receiving the end sealing parts 14 of the gasket, and the flanges 4, 5 on the sleeve halves are formed with grooves 16, 17, approximately quarter round in section, and forming, when the sleeve halves are bolted together, grooves open in the radially inward direction and at the ends for receiving the longitudinally extending portions 18 of the gasket. The flanges meet, as indicated in Fig. 2, leaving only a crack 19 to be sealed. The flange seating surfaces may be cast, and, accordingly, the opening of crack 19 adjacent the gasket may be of the order of a hundredth of an inch or even as much as a few hundredths of an inch. The grooves 12, 13 may also be cast, and in general no machining of flange or gasket groove surfaces is needed.

The grooves 12, 13 are of a width (in the axial direction) such as to fit the gasket sections 14, and are of a depth such as, when the flanges are bolted together, to compress the gasket portions 14 slightly, and a radial compression of about 5%, in accordance with usual O-ring practice, being suitable, and variations due to irregularities in the casting and necessary tolerances not being objectionable. The width of the groove formed by grooves 16, 17 (measured chordwise in Fig. 2) is also slightly less than the thickness of the straight gasket sections 18, so as to provide, again, a slight compression, of the order of about 5%. In consequence of the initial slight compression of the gasket sections 14, 18, a static seal is provided.

With the application of pressure due to leakage from a defective pipe being repaired or due to the opening of a passage for fluid flow from the pipe within the sleeve, as by boring for making a connection or any other purpose, the space inside the sleeve, as generally, fills with fluid at the pressure within the pipe, which pressure is communicated to the gasket sections 18, forcing them radially outward into the grooves 16, 17 and firmly against the cracks 19, thus providing an extremely effective seal. The gasket is preferably of rubber or similar synthetic material and, hence, while elastic in the ordinary sense, behaves in substance like an incompressible fluid, so that the gasket is forced into the crack 19 under substantially the full hydraulic pressure within the pipe, thus forming a complete and very effective seal.

At the ends, the gasket portions 14 will similarly be compressed in the axial direction, forcing them against the annular opening 20 between sleeve surfaces 8, 9 and the pipe at the outer edges of the grooves 12, 13 and forming here also an effective tight hydraulic seal on the familiar O-ring principle. The joint between the gasket sections 14, 18 presents no special sealing problem, as is obvious from a consideration of Fig. 5, showing the condition at this point. It will be noted that, in the construction shown, the gasket sections 18 are somewhat thinner than the sections 14 but that they are joined thereto so that the radially outward surfaces of these gasket sections are in alignment.

The gasket may be built up by bonding separate pieces of rubber or other resilient material together, or may be molded in one piece, as shown in Fig. 4, this piece being wrapped around into the shape shown in Fig. 3, which is the shape of the gasket of Figs. 1 and 2 in installation. The rings 14 are initially straight, as shown in Fig. 4, and have cooperating scarfed ends 21, which abut, as indicated in Fig. 3, along slanting lines 22. The scarfed engaging surfaces of the gasket portions 14 meeting along this line, may, during installation, be secured together with suitable adhesive or by thermal bonding, but ordinarily this is not necessary.

What is claimed is:

1. In a mechanical joint pipe sleeve, and in combination, a pair of sleeve halves each being substantially semi-cylindrical and comprising cooperating side flanges having grooves for receiving and holding a gasket in spaced relation to the wall of a pipe, and comprising also ends having annular grooves communicating with the first said grooves and adapted to receive end gaskets in sealing engagement with the pipe, and a one piece integral gasket comprising portions within the first said grooves and portions within the said annular grooves, the gasket portions within the first said grooves being thinner than those in the annular grooves and joined to the same substantialy flush with their radially outer surfaces.

2. In a mechanical joint pipe sleeve, and in combination, a pair of sleeve halves each being substantially semi-cylindrical and comprising cooperating side flanges having grooves for receiving and holding a gasket in spaced relation to the wall of a pipe, and comprising also ends having annular grooves communicating with the first said grooves and adapted to receive end gaskets in sealing engagement with the pipe, and a one piece integral gasket comprising portions within the first said grooves and portions within the said annular grooves, the radially outward surfaces of all the said grooves being substantially in a common cylindrical surface.

3. A unitary gasket for mechanical joint split constructions comprising a pair of end ring gaskets and a pair of longitudinal gasket strips joined thereto, in which the end ring gaskets are thicker than the longitudinal gasket strips and the said strips are joined to the end ring gaskets symmetrically thereof, whereby the entire gasket is adapted to fit in and touch a common cylindrical surface.

References Cited in the file of this patent

UNITED STATES PATENTS

| | | |
|---|---|---|
| 2,230,287 | Curtis | Feb. 4, 1941 |
| 2,571,348 | Drinkwater | Oct. 16, 1951 |
| 2,708,951 | Risley | May 24, 1955 |
| 2,760,792 | Fons | Aug. 28, 1956 |

FOREIGN PATENTS

| | | |
|---|---|---|
| 413,090 | Italy | Mar. 27, 1946 |
| 731,896 | Great Britain | June 15, 1955 |